United States Patent
Chandra et al.

(10) Patent No.: US 6,457,047 B1
(45) Date of Patent: Sep. 24, 2002

(54) APPLICATION CACHING SYSTEM AND METHOD

(75) Inventors: Ashok Chandra, Saratoga; Neil LaTarche, San Jose; Jianchang Mao, San Jose; Prabhakar Raghavan, Saratoga, all of CA (US)

(73) Assignee: Verity, Inc., Sunnyvale, CA (US)

( * ) Notice: Subject to any disclaimer, the term of this patent is extended or adjusted under 35 U.S.C. 154(b) by 0 days.

(21) Appl. No.: 09/566,675

(22) Filed: May 8, 2000

(51) Int. Cl.[7] .......................................... G06F 15/167
(52) U.S. Cl. ...................................... 709/217; 711/122
(58) Field of Search ............................... 709/220, 224, 709/229, 213, 214, 215, 216, 217, 218, 219; 711/124, 163, 119, 122; 707/202

(56) References Cited

U.S. PATENT DOCUMENTS

| | | | |
|---|---|---|---|
| 5,787,470 A | * 7/1998 | DeSimone | 711/124 |
| 5,933,849 A | * 8/1999 | Srbljic et al. | 711/118 |
| 5,944,780 A | 8/1999 | Chase et al. | 709/201 |
| 6,026,413 A | * 2/2000 | Challenger et al. | 707/202 |
| 6,052,718 A | * 4/2000 | Gifford | 709/219 |
| 6,138,162 A | * 10/2000 | Pistriotto et al. | 709/229 |
| 6,216,212 B1 | * 4/2001 | Challenger et al. | 711/163 |
| 2001/0039565 A1 | * 11/2001 | Gupta | 709/203 |

OTHER PUBLICATIONS

Arnt Gulbrandsen et al., RFC2052 A DNS RR for specifying the locationo of services (DNS SRV), Internet Society, Oct. 1996, 8 pages.*

Dean Povey et al., A Distributed Internet Cache, Proceedings of the 20th Australasian Computer Science Conference, Feb. 1997, 10 pages.*

Li Fan et al., Summary Cache: A Scalable Wide–Area Web Cache Sharing Protcol, Tech rep 1361, Department of Computer Science, University of WisconsinMadison, Feb. 1998.*

* cited by examiner

*Primary Examiner*—Patrice Winder
(74) *Attorney, Agent, or Firm*—Gray Cary Ware & Freidenrich LLP

(57) ABSTRACT

An application caching system and method are provided wherein one or more applications may be cached throughout a distributed computer network. The system may include a central cache directory server, one or more distributed master application servers and one or more distributed application cache servers. The system may permit a service, such as a search, to be provided to the user more quickly.

3 Claims, 8 Drawing Sheets

2. CDNow's WEB SERVER SENDS A PAGE WITH A SEARCH FORM.

1. CUSTOMER "A" VISITS CDNow's WEBSITE.

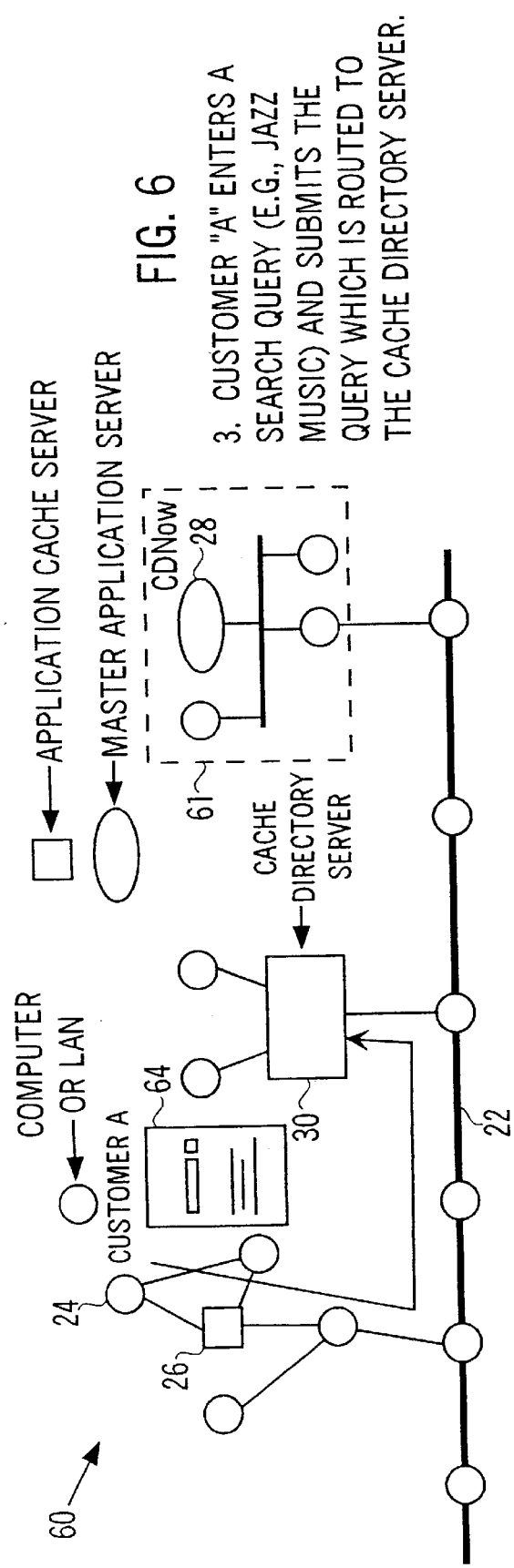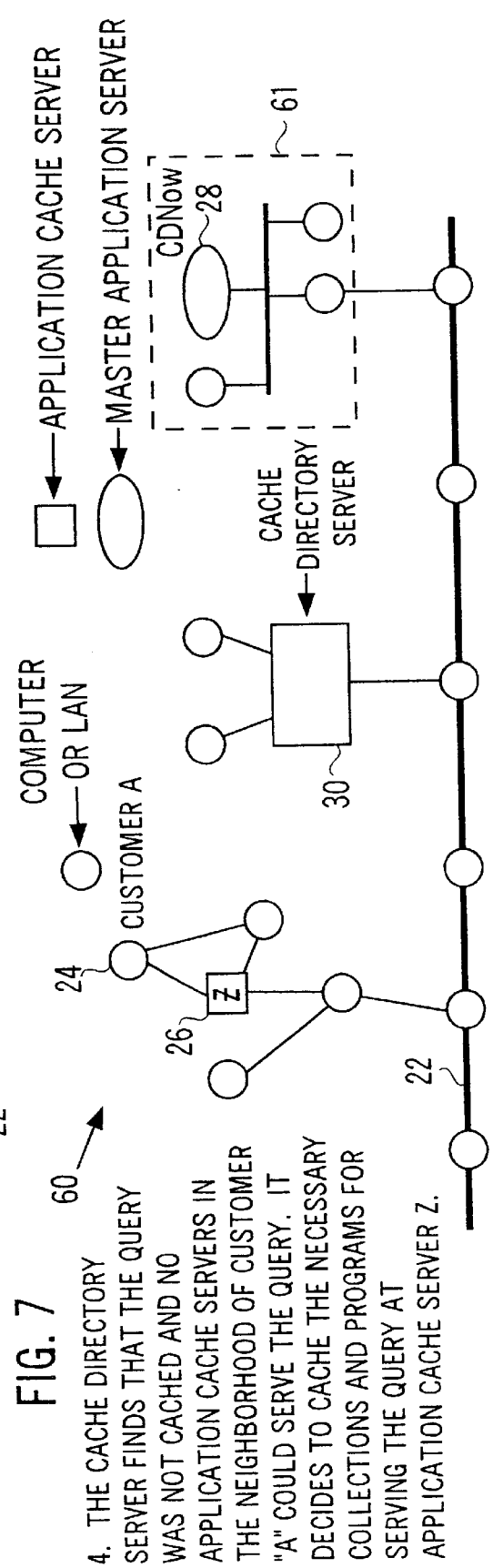

7. THE CACHE DIRECTORY SERVER UPDATES ITS DIRECTORY AND CACHE THE SEARCH RESULTS.

8. WHEN CUSTOMER "B" SUBMITS THE SAME QUERY AS "A" DID (STEPS 1-3 ARE EXECUTED), THE CACHE DIRECTORY SERVER SENDS THE CACHED RESULTS DIRECTLY TO CUSTOMER "B".

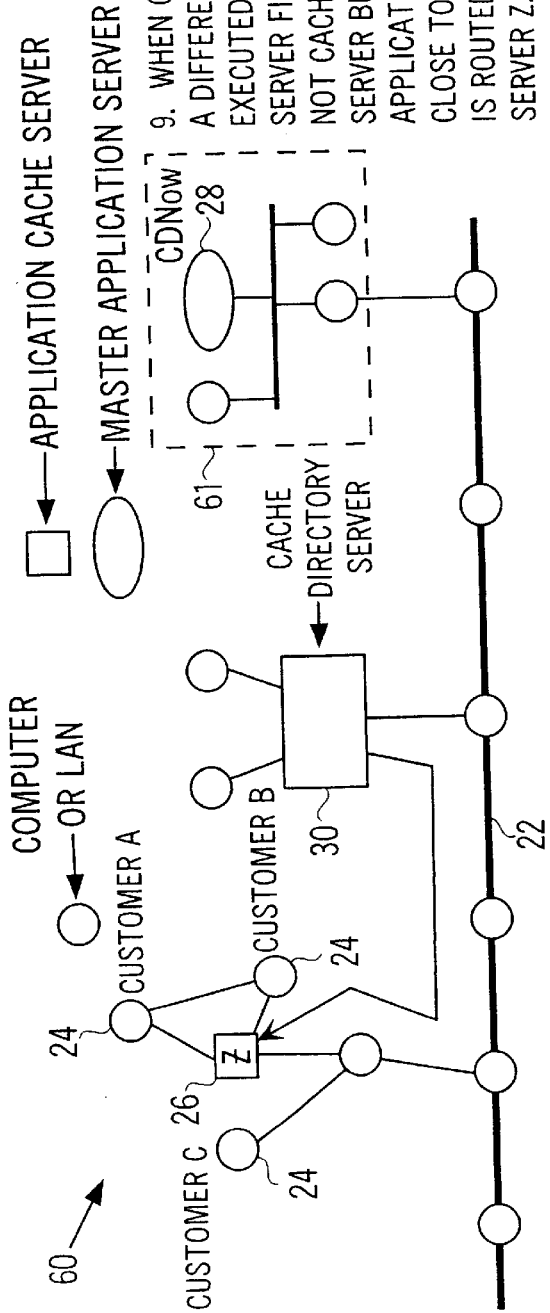
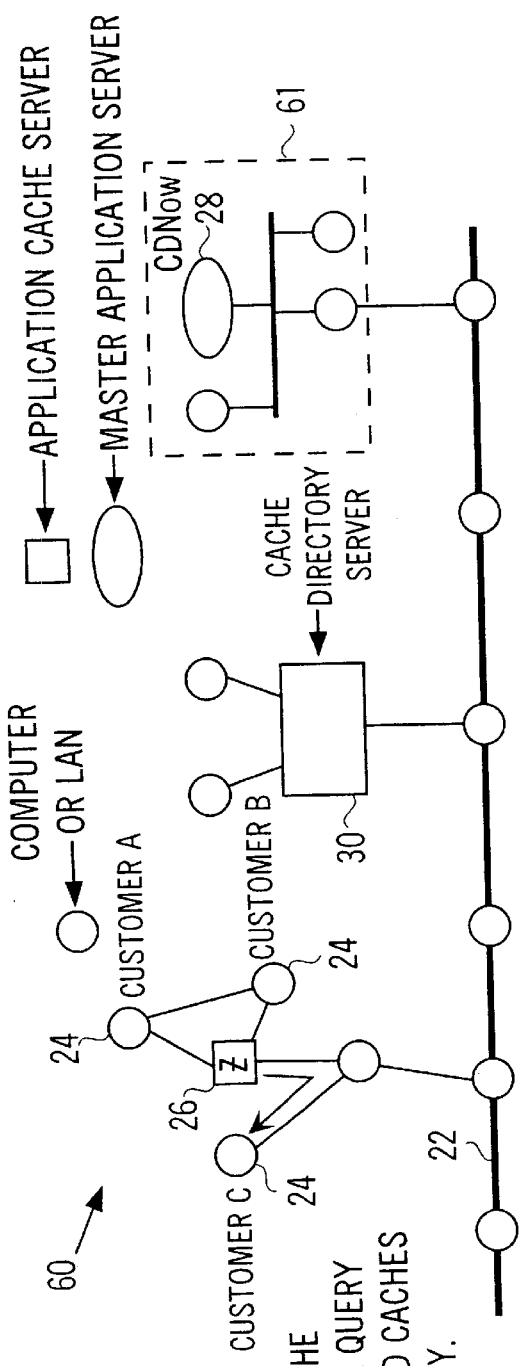

APPLICATION CACHING SYSTEM AND METHOD

BACKGROUND OF THE INVENTION

This invention relates generally to a system and method for caching an application on a computer and in particular to a system and method for remotely storing a software application or software application module so that the application is distributed through a computer network.

A typical web browsing application, such as Netscape® Navigator or Microsoft® Explorer, permits the user to cache web pages on their local computer. Then, during future browsing sessions, prior to retrieving the requested page from the server, the browser checks to see if the web page is still stored in the web page cache. If the web page is in the cache, it is loaded from the cache. Otherwise, the browser requests the web page from the server. Typically, the browser deletes the cache after a certain period of time and does not permit caching of certain types of web pages, such as dynamic web pages. This type of caching may be referred to as static web page caching.

AT&T has developed a computer network with shared static caching wherein there may be a computer network to which one or more computers are attached. The computer network may also include a central server that has a central cache directory. Each time that a computer connected to the computer network caches a data object, it provides an update to the central cache directory. In addition, when a new computer connects to the computer network, the new computer's list of cached objects are uploaded to the central cache directory so that the central cache directory has a listing of all of the cached objects across the computer network. Then, when any computer requests an object, the central cache directory is checked to determine if the object is cached at one of the other computers so that the computer may retrieve the object from one of the other computers. If the object is not cached at any other computer based on the search of the central cache directory, the computer retrieves the object over the computer network and then updates the central cache directory to inform it that the computer now has a cached copy of the object. This system is an improvement over a typical proxy server system since the proxy server ends up being the bottleneck point. This system provides a distributed cache in that the cached objects are distributed between all of the computers connected to the computer network and the only information on the central computer is the central cache directory. In this system, static objects, such as web pages or the like, may be cached. The limitation of the typical web browsers and the distributed cache is that these systems do not permit dynamic data to be cached. For example, these systems do not permit software applications or software application modules to be cached.

In a distributed computing environment, there may be a number of computing nodes that store pieces of static data (files, multimedia, etc.). These nodes are connected together by network links. These nodes also field requests for service (a simple example of a request could be "give me access to data file X"). Since the time taken to send the requested data object over networks links from the node where it is stored to the node that requested it can be significant, it is common to use a caching service to replicate the data objects at various nodes. The basic idea is that when a request for a data object, X, is received at a node, N, of the network, the caching service seeks a copy of X that is "close" to N (in terms of number of network links to be traversed, or estimated network delay or some other compound measure of proximity). By actively managing the replication of data objects in response to incoming requests, the caching service is typically able to service the incoming requests in such a way that users making the service requests experience quicker responses on average. This caching service is typically a distributed program running at the various nodes of the network and has to manage such issues as the amount of storage available at each node, the network overhead caused by preemptively replicating data at multiple nodes, and the consistency of multiple copies of a data object (i.e., what happens if one copy of an object is modified by some other program). Such distributed caching is at the heart of an internet caching service such as that provided by Akamai, Inc.

A common technique for dealing with the above problem and limitation is called server-mirroring. The basic idea is to statically replicate the database, D, and the search application for the database, A, at a number of nodes of the network so that in essence the query service is replicated in its entirety at multiple nodes. If a web site has multiple mirror sites, a directory name service (DNS) lookup (typically requested by the browser) will return multiple IP addresses in a list with a predefined order and the browser typically selects the first IP address. If the server selected by the browser is overloaded and a time-out occurs, the browser will select the next IP address in the list as so on.

There are several difficulties with this approach. First, the replication of D and A at multiple nodes means permanently locking down storage and computational resources at a number of network nodes. This is especially significant when the network (for instance, the internet) is offering hundreds of such search and other services. Second, the assignment of nodes at which to replicate D and A is static in that it does not respond to changes in user request patterns. For instance, search services relating to financial information may be more accessed in North American business hours whereas, later in the day, North American users tend to seek sports- and entertainment-related information, while users in the Far East begin to seek financial information. Third, the database, D, is replicated in its entirety. However, it is well known that a large fraction of queries concentrates on a small fraction of the database (so-called spatial locality). In addition, there are patterns of temporal locality (for instance, a surge in interest in financial information on a company in response to a news item about the company). Thus, it is desirable to provide a software application caching system and method that overcomes the above described limitations and problems with conventional systems and it is to this end that the present invention is directed.

SUMMARY OF THE INVENTION

The application caching system and method in accordance with the invention permits service request across the computer network to be executed in an efficient manner without copies of the application and data to service the service request located at each node of the computer network. The application caching system thus minimizes the latency associated with fulfilling the service request. The application caching system may be used with a variety of different applications including search applications and the like.

Thus, in accordance with the invention, an application caching system is provided. The system comprises a computer network and a cache directory connected to the computer network that controls the caching of an application across the computer network. The system further comprises a master application computer that stores one or more applications and the data associated with the one or more applications, and an application cache computer that receives an application and its associated data from the master application computer in order to service a request from a computer located near the application cache computer. In more detail, the cache directory further comprises a list of prior service requests and prior service results and the location of the resources for servicing the service and a central cache dispatcher for dispatching a service request to the appropriate application cache computer.

The central cache dispatcher returns the cached result if the current service request matches a prior service request and determines if the application cache computer adjacent the service requester can handle the service request. The central cache dispatcher may, if the adjacent application cache computer cannot handle the service request, forward an application and data necessary to execute the service request to an application cache computer near the service requester to execute the service request. A method for application caching in accordance with the invention is also described.

BRIEF DESCRIPTION OF THE DRAWINGS

FIGS. 4–13 are diagrams illustrating an example of the operation of the software application caching system in accordance with the invention.

DETAILED DESCRIPTION OF A PREFERRED EMBODIMENT

The invention is particularly applicable to a system for caching a search software application and it is in this context that the invention will be described. It will be appreciated, however, that the device and method in accordance with the invention has greater utility since it may be for caching any type of dynamic object and may be used for various other different software applications including a mortgage calculation program or a web page summarizer. In accordance with the invention, the distributed caching paradigm described above may be generalized and extended to permit the caching of other software applications on the network in addition to typical data object caching. To better understand the invention, a simple example of a search in a database will be described before describing the system in detail.

Therefore, consider a database, D, of records that can be accessed by a search application, A, in response to a user query, Q. In particular, the search application A retrieves from D a set of results matching the query Q. For instance, the database D could be a relational database of financial data, A could be a database application, and Q could ask for a list of all companies whose stock price is between $50 and $55. In a traditional network (such as the internet today), Q is routed to the network node N containing D and the application A. At N, the application A searches through D, generates the answer to the query Q, then routes the results back to the network node that originated the request. In the process, the user experiences delays resulting from two sources: (1) the transit time for the query to travel through the network to the (unique) node N containing D and A; and (2) the contention resulting from many users on the network all sharing the computing resources at N. To solve these problems, the software application caching system in accordance with the invention as will now be described may be used.

Figure 1:
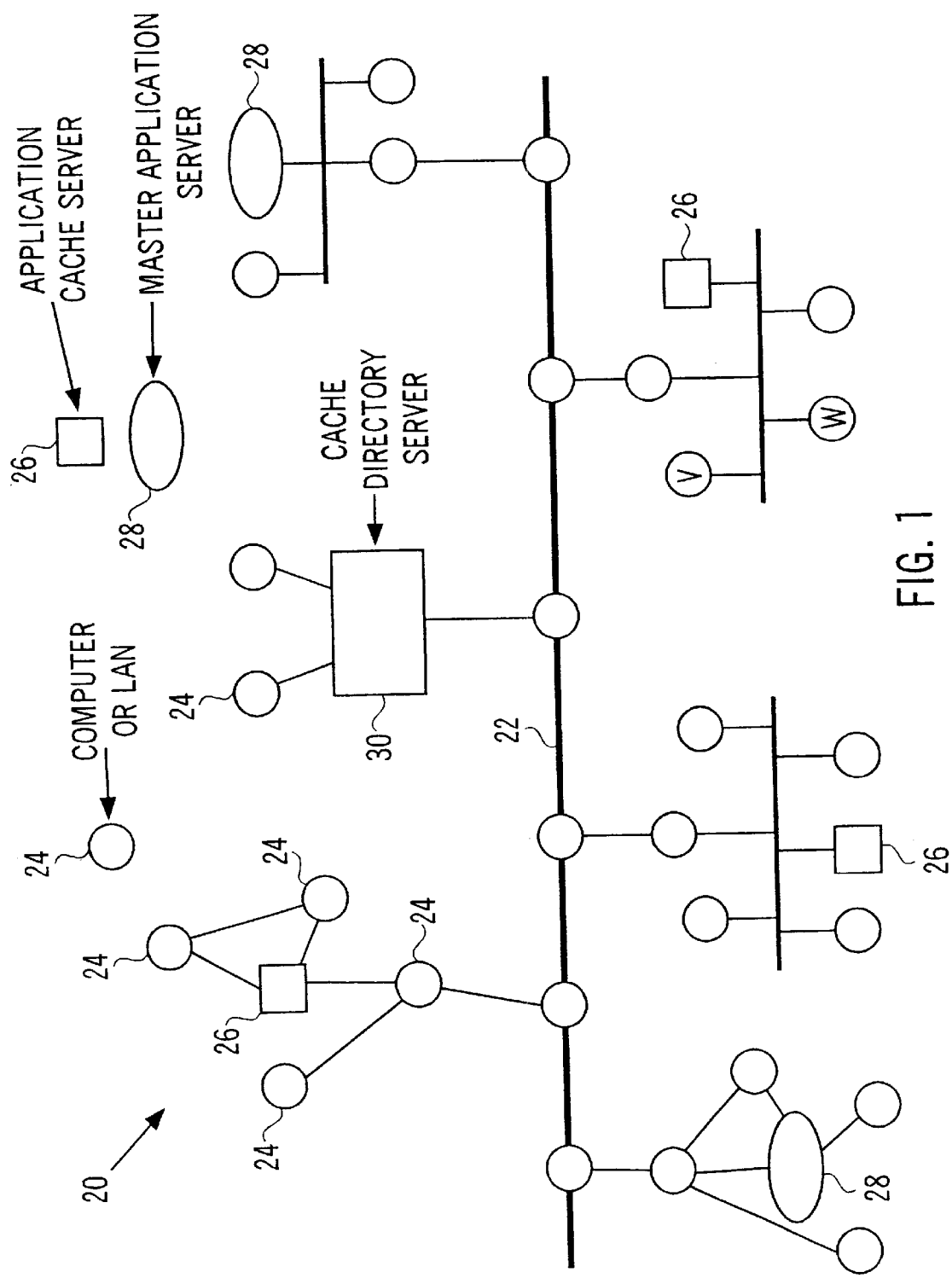
FIG. 1 is a block diagram illustrating a software application caching system in accordance with the invention.

FIG. 1 is a block diagram illustrating a software application caching system 20 in accordance with the invention. The system 20 may include a computer network 22, such as a wide area network like the Internet or the World Wide Web, that connects together one or more individual computers or local area networks (LANs) 24 (shown as circles in the diagram). The system 20 may also include one or more application cache servers 26 (shown as squares in the diagram), one or more master application servers 28 (shown as large ovals in the diagram) and a central cache directory server 30 that are all connected to the computer network. The computer network along with the various computing resources as shown in FIG. 1 form a web of computing resources. Although for purposes of this description a single application being cached is described, multiple applications may be cached and there may be multiple master application servers so that a plurality of applications in accordance with the invention may be cached.

In accordance with the invention, the application cache servers 26 may be distributed geographically throughout the computer network. In addition, the master application servers 28 may be strategically placed around the computer network. In particular, each master application server provides a set of specific services to its customers. For example, the master application servers shown in FIG. 1 may include the CDNow and HomeDepot servers. In more detail, a master application server may maintain all the services (e.g., the whole data collection D and all of the application programs A) for the corresponding application. The application cache server 26, on the other hand, may cache a number of sub-collections (e.g., a subset of $\{D_1, D_2, \ldots, D_n\}$, a partition of D) and necessary application programs (a subset of $\{A_1, A_2, \ldots, A_m\}$, a partition of A). The decision of what, where, and how to cache is based on statistics of time- and node-dependent query patterns. The cache directory server 30 connected to the network keeps track of the status (what services have been cached on what servers) of all the application cache servers on the network. The cache directory server also hosts a central query dispatcher that routes a query to the nearest application cache server and then routes the result back to where the query was originated. Now, the operation of the application caching system in accordance with the invention will be described.

Figure 2:
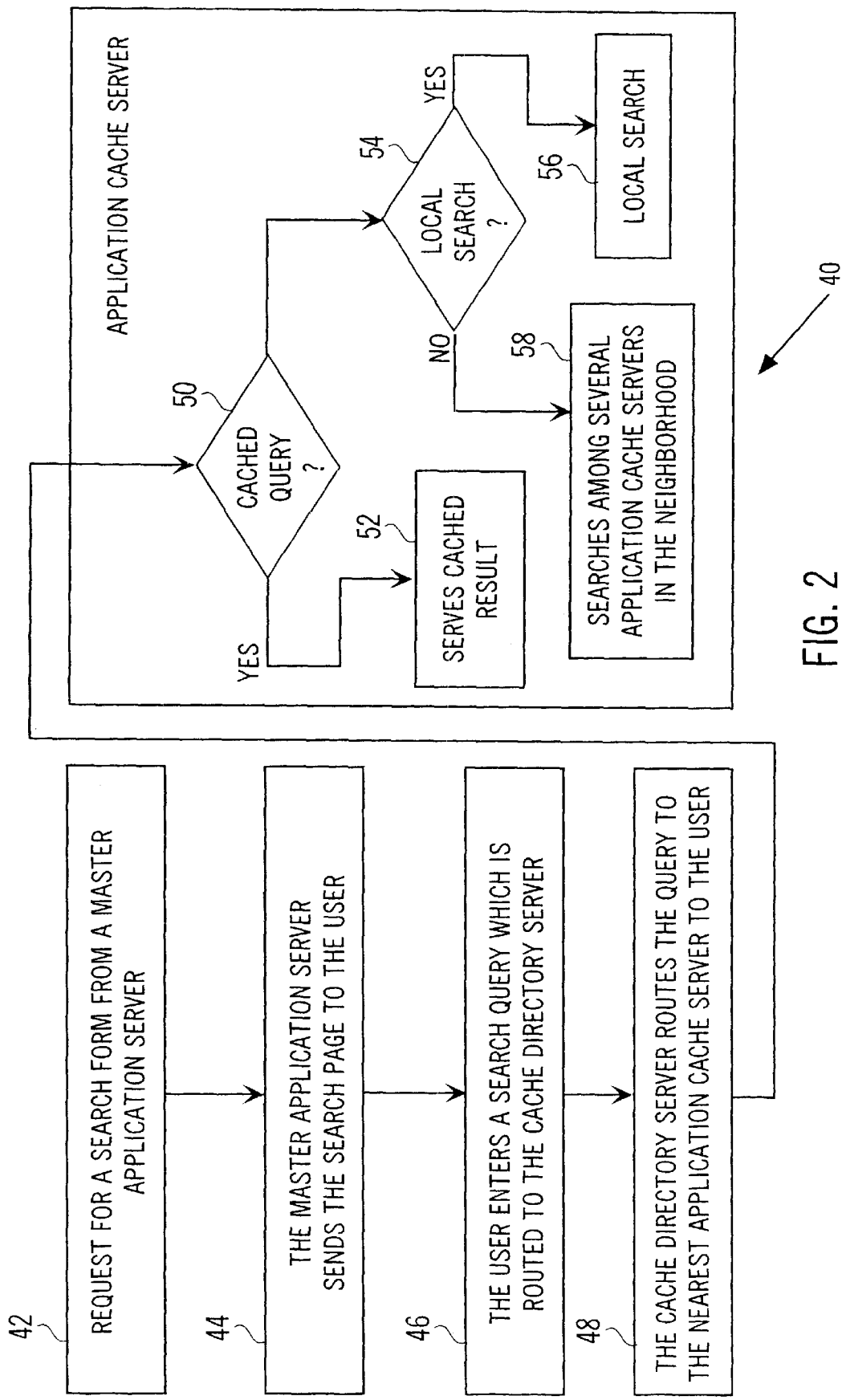
FIG. 2 is a flowchart illustrating a method for software application caching in accordance with the invention.

FIG. 2 is a flowchart illustrating a method 40 for software application caching in accordance with the invention. In particular, a query is typically served in the distributed application caching system according to the workflow shown in FIG. 2. In more detail, the user may request a search form from a web site which then forwards the request to the master application server in step 42. The master application server may then send the search page form to the user in step 44. In step 46, the user may submit the query using the search form that the user received from a Master Application Server (e.g., CDNow). The query is actually routed to the cache directory server. Upon receiving the user query, the central query dispatcher in the cache directory server first checks whether that query has been asked in the recent past, and whether its result is available at a node in the vicinity of the node where the query originated. If the result of the query is already close to the originating node, the central query dispatcher may choose to respond with this recent result. Otherwise, the central query dispatcher may look at a centrally maintained table that lists, for common queries, the fraction of results from each of the collections. In step 48, the cache directory server may route the query to the nearest application cache server. At the application cache server, the server may determine in step 50 if the query has been previously executed and cached. If the query results have been previously executed and cached, the application cache server may serve the cached results to the user in step 52. If the query has not been previously cached, the application cache server determines if the query is a local search in step 54(e.g., can the search be executed using resources local to the application cache server?). If the query can be executed locally, then the application cache server may execute the query locally in step 56. Otherwise, the application cache server searches among the application cache servers in it neighborhood in step 58 for the necessary computing resources to execute the query.

For instance, on the query "IBM", the table may contain entries stating that, at the last estimation of result sizes, 70% of the results for this query come from collection $D_3$, 26% from $D_7$ and the rest from $D_{11}$. The dispatcher then identifies in the table that there is currently a cached copy of $D_3$ at the node V where the query originated and copies of $D_7$ and $D_{11}$ are at a neighboring node W in the network (See FIG. 1). It therefore forwards the task of servicing the query to V together with the information it needs to spawn a sub-query to neighbor W. Node V runs the query against its collection, collates the results of the sub-query from W, and then returns the result to the user.

For the above application caching method in accordance with the invention, copies of the application A must be resident and running at both V and W in the above example. In an environment where there are potentially thousands of such applications providing services throughout the network, it may not be possible to maintain a copy active at every node of the network. Therefore, it is sufficient to cache a subset of the applications (at a subset of the nodes) wherein the favored combination of subsets are the most frequently accessed applications nearest the nodes that access them most often. Notice, further, that the application A need not be bound to a particular search service—it can be shared across multiple search services. Other obvious generalizations include the use of more than one data source D, and/or the use of more than one application A, in composing the results for a query (in many cases, a service assembles the results of several queries to assemble a result for the end-user—for instance, a 20-minute-delayed stock quote, plus a 3-month stock chart, plus a text search for news on a company—each summoned from a distinct database or text source).

A large number of applications can benefit from distributed application caching in accordance with the invention. For example, as a rapidly increasing number of handheld devices (or small-form-factor devices such as, PDAs, Palm Pilots, pagers, cellular phones) access the web, document summarization becomes very important because of the small-size screen on the handheld devices and the limited bandwidth between handheld devices and web servers using Wireless Application Protocol (WAP). The distributed application caching in accordance with the invention is well suited for dealing with this problem. In particular, a document summarization program (such as the one from Verity, Inc.) can be cached on the application cache servers across the network. Thus, when an application server receives a request originated from a handheld device, it uses the cached document summarizer to serve up a small-footprint version of the document in the WML (Wireless Markup Language) format, unbeknown to the content originator. Other examples of applications that benefit from the application caching in accordance with the invention include a CGI program or a servlet for Mortgage calculation that can be cached on the application cache servers across the network to reduce the load on the master application server. Now, a method for handling dynamic requests in accordance with the invention will be described.

Figure 3:
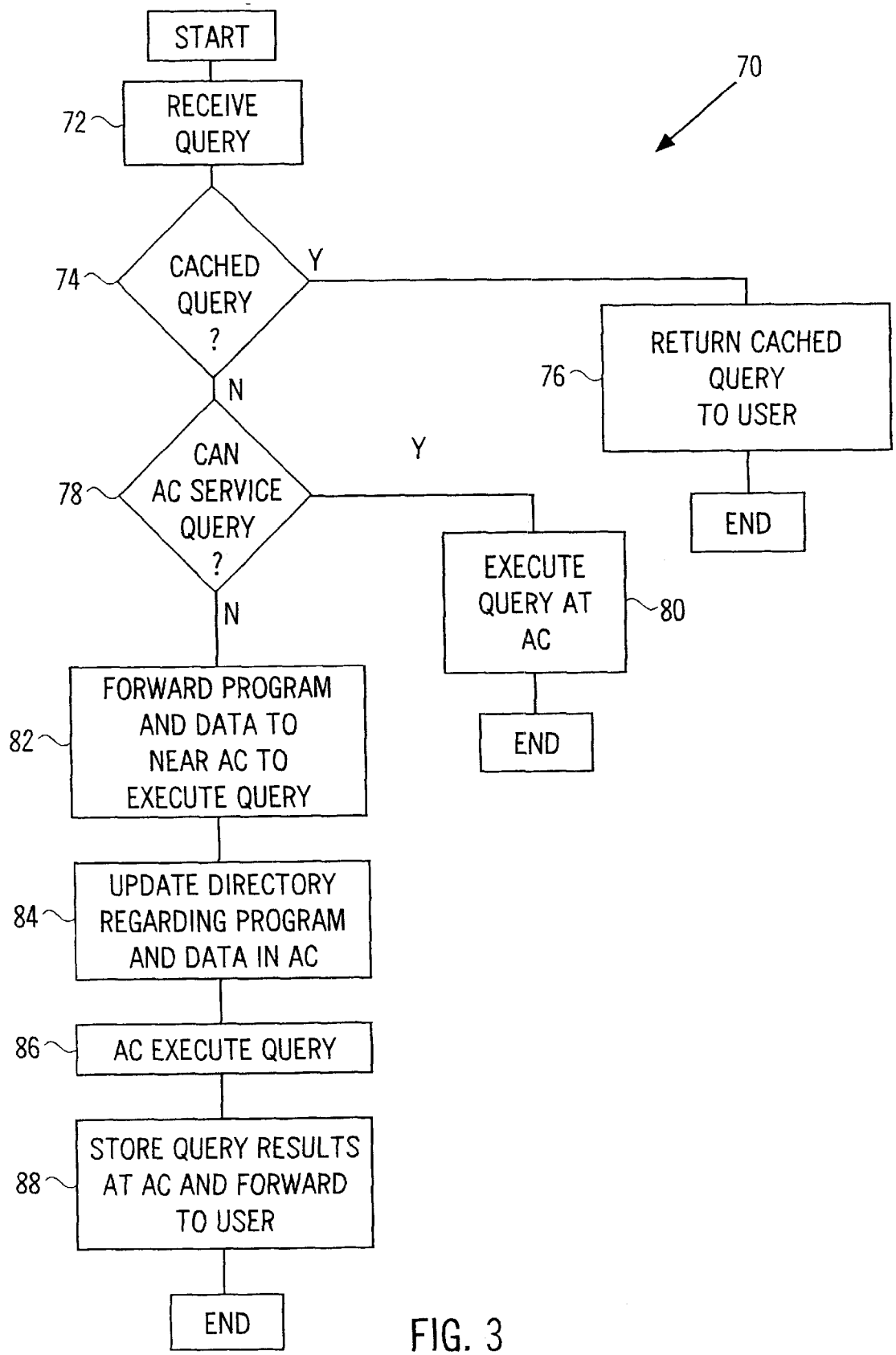
FIG. 3 is a flowchart illustrating a method for handling dynamic application requests in accordance with the invention.

FIG. 3 is a flowchart illustrating a method 70 for handling dynamic service requests in accordance with the invention. In particular, the method, based on the particular service request, such as a query, attempts to find the best solution to the service request. The solution to the service request may include returning a cached result (best solution), executing the query on an application cache computer (AC) in the same LAN as the query or downloading the necessary program and data to an AC near the query requester so that that AC can execute the query.

In step 72, the cache directory receives an incoming query from a user. Using the table stored in the cache directory as described above, the dispatcher in the cache directory may determine if the query is cached in the system in step 74. If the query has been previously cached, then the cache directory will direct the cached result to the user to fulfill the user's query in step 76. This is the best solution since there will be minimal latency since the query does not need to be repeated. This solution also saves computing resources since the query does not need to be repeated. If the query has not been cached, then the cache directory determines if the application cache (AC) computer on the same LAN as the user can service the query in step 78. The AC can service the query if it has the appropriate program and data to execute the query.

If the AC local to the user has the appropriate facilities, then the AC executes the query in step 80 and returns the query results to the user. The local AC may also store the query results and forward the query results to the cache directory so that similar future queries may be more easily satisfied. If the AC local to the user cannot server the query, then the cache directory may select an AC near the user and download/forward the necessary program and data to execute the query in step 82 so that that AC can execute the query. This option is the least desirable since it requires forwarding the program and data to the AC, but ensures that the query is executed as close to the user as possible so that the latency due to distance between the user and the AC is minimized. In step 84, the cache directory updates its table to reflect that the particular AC has the necessary programs and data to execute the query. In step 86, the AC near the user executes the query. In step 88, the AC forwards the results to the user and stores a copy of the results on the AC. The AC may also forward the results to the cache directory. In this manner, each service request received by the application caching system is executed in the most efficient manner without requiring a copy of the program and data at each node in the network. Thus, the application caching system reduces the amount of redundancy in the network, but ensures that all service requests are handled in the most efficient manner. Now, an example of the application caching in accordance with the invention will be described.

Figure 4:
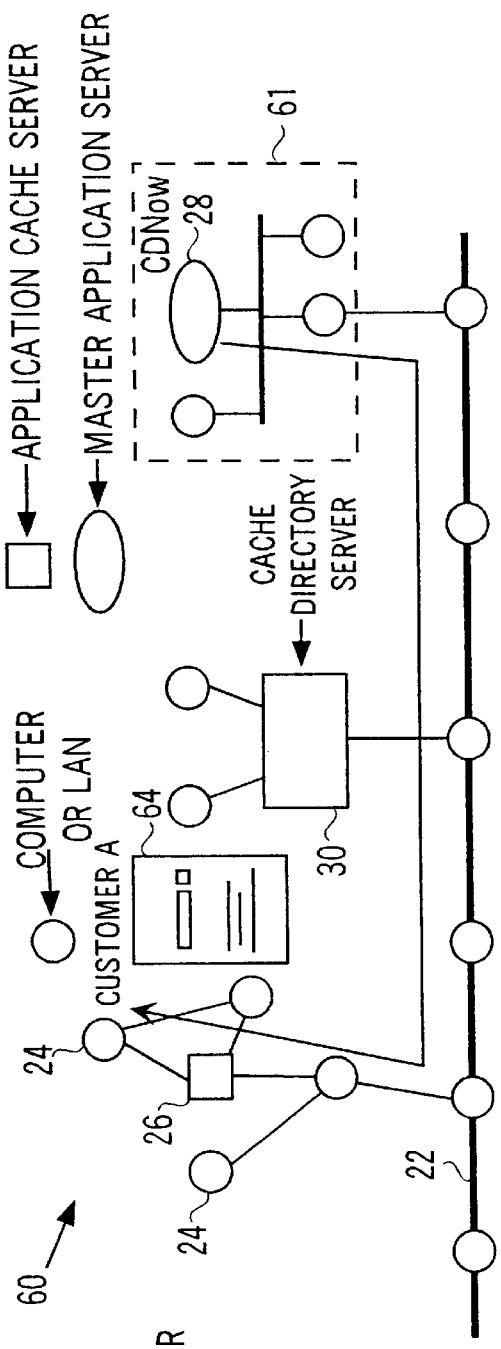

FIGS. 4–13 are diagrams illustrating an example of the operation of the software application caching system in accordance with the invention. In this example, a user may visit a web site, such as CDNow, that includes product searching capabilities. These product searching capabilities may be implemented using the application caching system in accordance with the invention. In particular, as shown in FIG. 4, a computer network 60 may include the computer network 22 connected a plurality of computers/LANs 24 together along with the application cache server 26, the master application server 28 and the central cache directory server 30. In this example, the master application server is housed at the CDNow web site 61 and is owned and run by CDNow and provides CDNow user's with the benefits of the application caching system. In particular, when a customer (Customer A) visits the CDNow web site and desires to complete a search, the user's request traverses the computer network as shown by an arrow 62.

Figure 5:
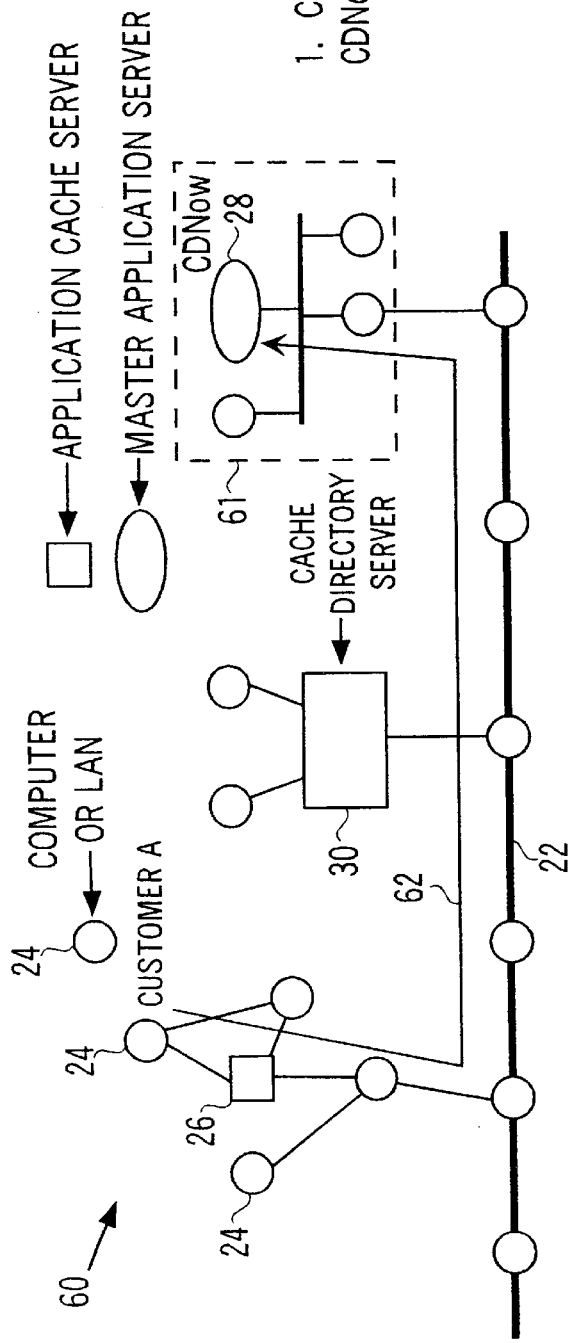

As shown in FIG. 5, in response to the search form request from the user, the CDNow web site 61 returns a search form 64 to the customer over the computer network. As shown in FIG. 6, the user may enter the query into the form and the submission of the query is redirected to the cache directory server 30. In particular, the search form provided to the user may include information about the address of the cache directory server 30 so that the user's query is automatically directed to that cache directory server. As shown in FIG. 7, the cache directory server may determine whether the query and its results is cached in the system (in this example, the query was not cached) and may determine if an application cache server near the customer can service the query (in this example, the application cache server near the customer (within the LAN of the customer) cannot service the query since the search application to process the query or the data for the query is not located near the application cache server). Based on the above determinations, the cache directory server 30 decides to cache the necessary data and programs for serving the query at the application cache server, Z.

Figure 8:
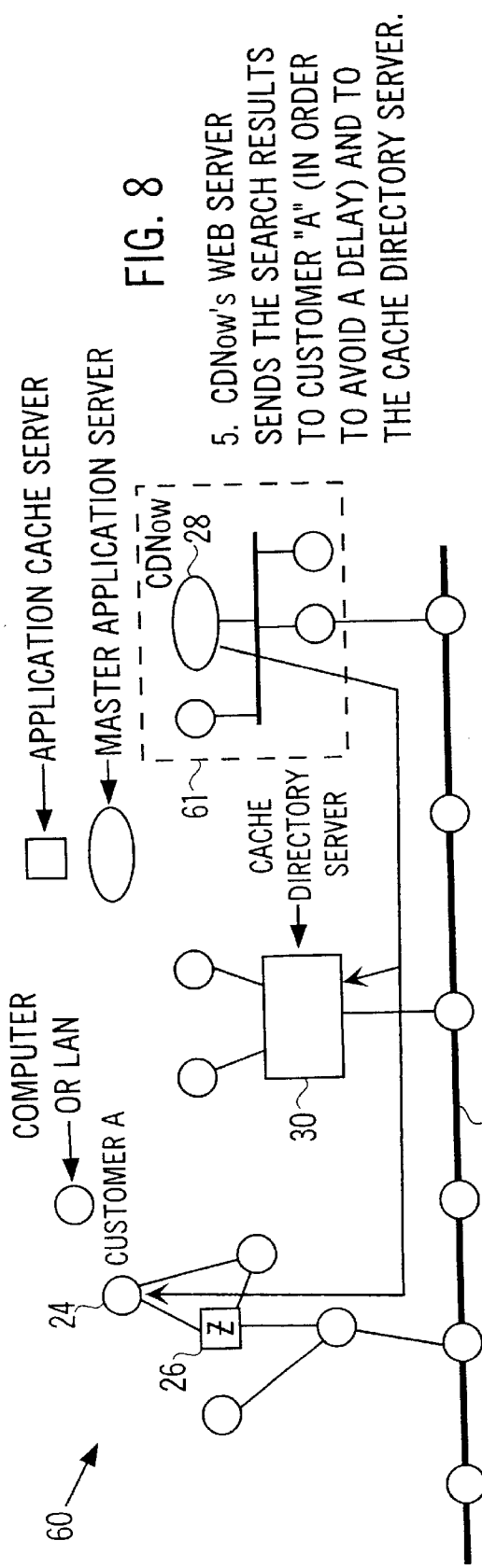
Figure 9:
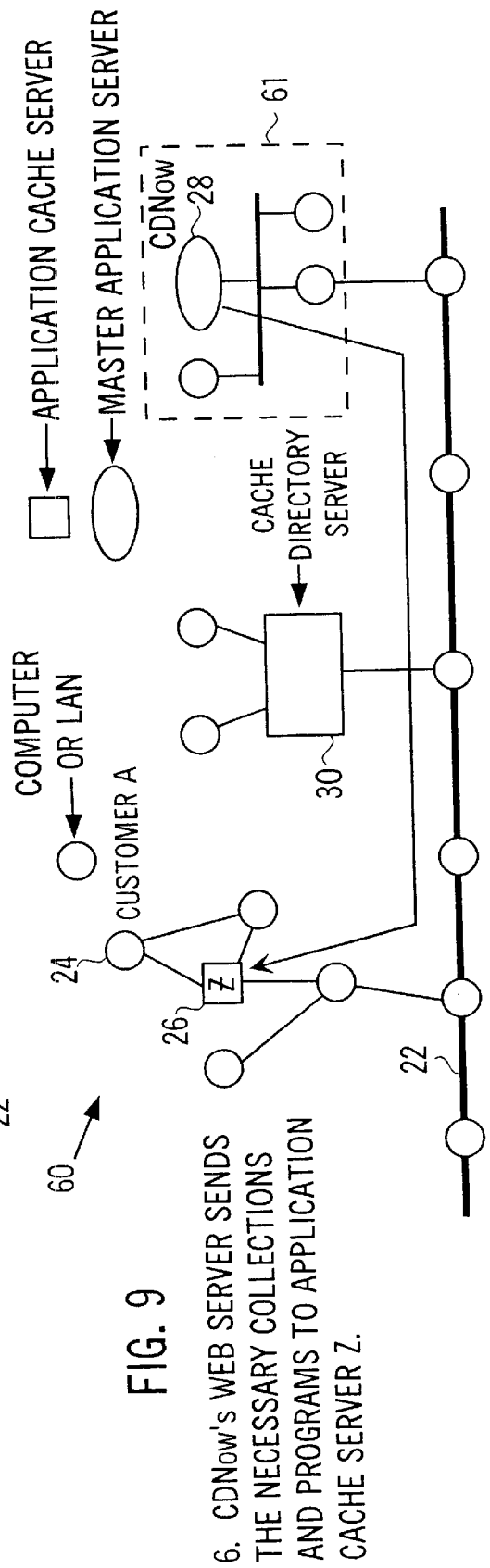
Figure 10:
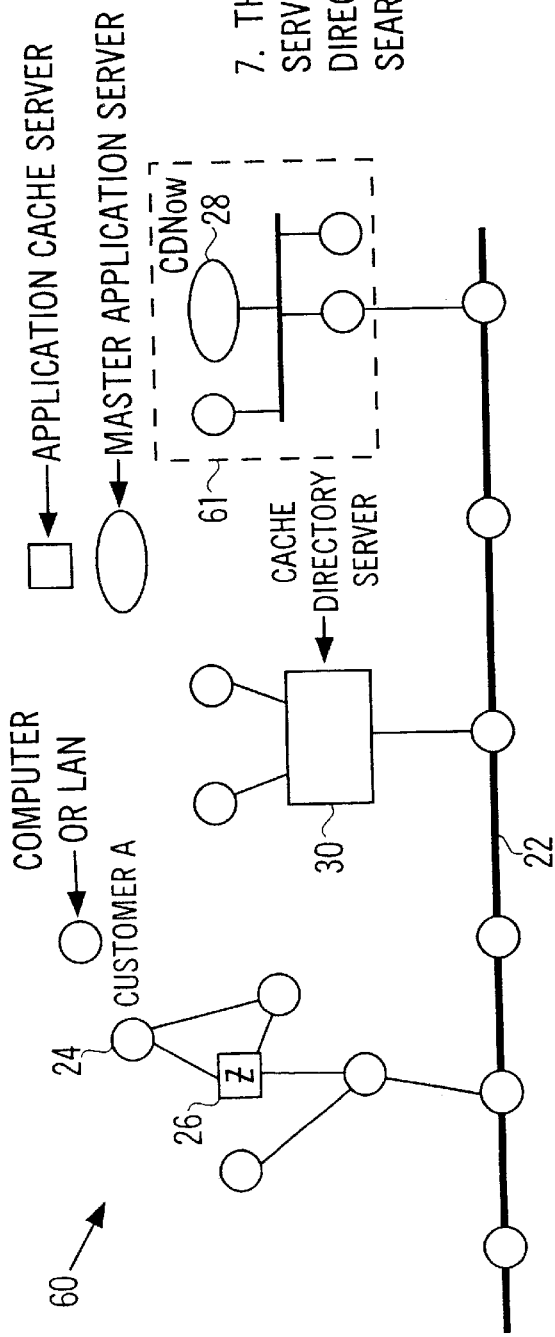
Figure 11:
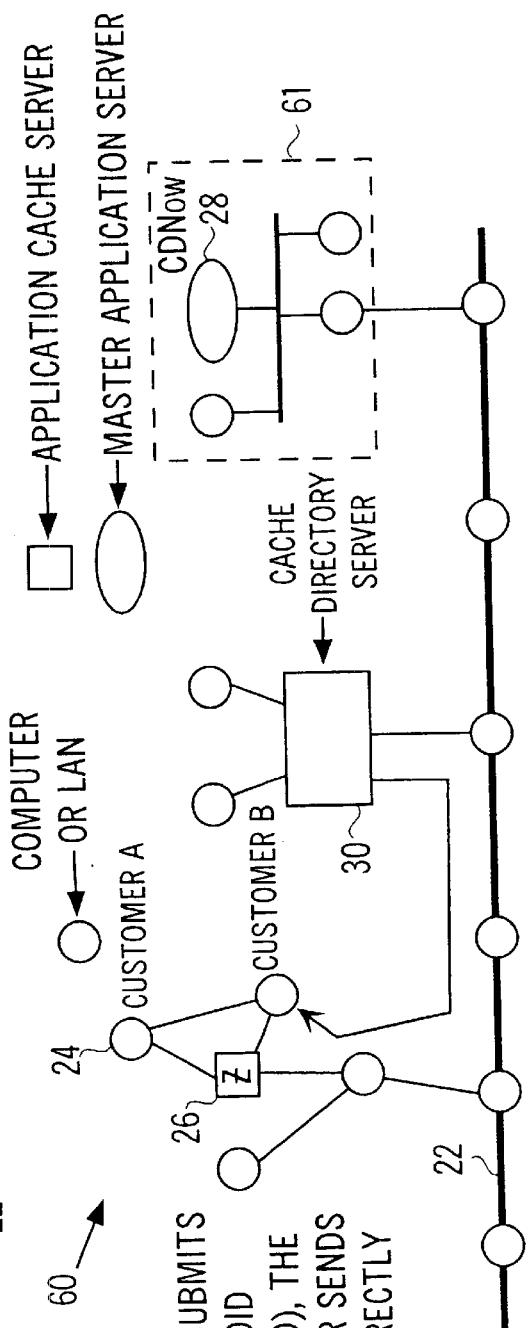

As shown in FIG. 8, the CDNow web site 61 may gather the results of the query and send the search results to customer A (for review) and to the cache directory server (so that the list of cached queries at the cache directory server may be updated). As shown in FIG. 9, the CDNow web site 61 and in particular the master application server 28, sends the necessary collections of data and programs to the application cache server Z so that it can, in the future, service the query. At the same time, as shown in FIG. 10, the cache directory server may update its directory to reflect that application cache server Z has the data and programs downloaded to it and cache the search results. Then, as shown in FIG. 11, when customer B at a different LAN or computer submits the same query as A to the CDNow web site 61, steps 1–3 as shown in FIGS. 5–7) are executed. In this case, the cache directory server sends the cached query results from A's query directly to B. As shown in FIG. 12, when a third customer (Customer C) submits a different query, the cache directory finds that the query is not cached at the cache directory server (unlike Customer's B query), but that it can be served by application cache server Z since it is currently storing the data and program needed to service the search and it is close to Customer C. Therefore, the query for Customer C is routed to application cache server Z. Then, as shown in FIG. 13, application cache server Z serves the query for Customer C and then caches the query results locally. The application cache server Z may then update the cache directory server 30 so that it knows that application cache server Z has a locally cached copy of the query results.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. An application caching system, comprising:

a computer network;

a cache directory connected to the computer network that controls the caching of an application across the computer network;

a master application computer that stores one or more applications and the data associated with the one or more applications;

an application cache computer that receives an application and its associated data from the master application computer in order to service a request from a computer located near the application cache computer;

wherein the cache directory further comprises a list of prior service requests and prior service results and the location of the resources for servicing the service and a central cache dispatcher for dispatching a service request to the appropriate application cache computer; and wherein the central cache dispatcher further comprises means for returning the cached result if the current service request matches a prior service request, means for determining if the application cache computer adjacent the service requester can handle the service request and means, if the adjacent application cache computer cannot handle the service request, for forwarding an application and data necessary to execute the service request to an application cache computer near the service requester to execute the service request.

2. The system of claim 1, wherein the service comprises a query.

3. An application caching method in a computer network having a cache directory that controls the caching of an application across the computer network, a master application computer that stores one or more application and the data associated with the one or more applications, and an application cache computer that receives an application and its associated data from the master application computer in order to service a request from a computer located near the application cache computer, the method comprising:

returning a cached result if a current service request matches a prior service request;

determining, if no cached result exists, if an application cache computer adjacent the service requester can handle the service request;

forwarding the service request to the adjacent application cache computer for execution of the service request; and forwarding, if the adjacent application cache computer cannot handle the service request, the application and data necessary to execute the service request to an application cache computer near the service requester to execute the service request.

* * * * *

UNITED STATES PATENT AND TRADEMARK OFFICE
CERTIFICATE OF CORRECTION

PATENT NO.     : 6,457,047 B1
DATED          : September 24, 2002
INVENTOR(S)    : Chandra et al.

It is certified that error appears in the above-identified patent and that said Letters Patent is hereby corrected as shown below:

<u>Title page,</u>
Item [75], The name of inventor "Neil LaTarche" is misspelled.
Please amend to read -- Neil Latarche --.

Signed and Sealed this

Fourth Day of February, 2003

JAMES E. ROGAN
*Director of the United States Patent and Trademark Office*